US007711904B2

(12) United States Patent
Emma et al.

(10) Patent No.: US 7,711,904 B2
(45) Date of Patent: May 4, 2010

(54) SYSTEM, METHOD AND COMPUTER PROGRAM PRODUCT FOR EXECUTING A CACHE REPLACEMENT ALGORITHM

(75) Inventors: Philip G. Emma, Danbury, CT (US);
Daniel N. Lynch, Austin, TX (US);
Thomas R. Puzak, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 11/689,592

(22) Filed: Mar. 22, 2007

(65) Prior Publication Data
US 2008/0235453 A1   Sep. 25, 2008

(51) Int. Cl.
*G06F 12/00* (2006.01)
(52) U.S. Cl. .................................... 711/136
(58) Field of Classification Search .................. None
See application file for complete search history.

(56) References Cited

U.S. PATENT DOCUMENTS

| | | | |
|---|---|---|---|
| 5,594,885 A * | 1/1997 | Lautzenheiser | 711/133 |
| 6,516,388 B1 * | 2/2003 | McCormick et al. | 711/136 |
| 6,542,966 B1 * | 4/2003 | Crawford et al. | 711/133 |
| 6,721,856 B1 * | 4/2004 | Arimilli et al. | 711/146 |
| 6,823,048 B2 * | 11/2004 | Gillespie | 379/88.19 |
| 7,162,584 B2 * | 1/2007 | Adl-Tabatabai et al. | 711/118 |
| 7,502,890 B2 * | 3/2009 | Kailas et al. | 711/133 |
| 7,526,608 B2 * | 4/2009 | Yasue | 711/121 |
| 7,555,597 B2 * | 6/2009 | Srivastava et al. | 711/113 |
| 2006/0101208 A1 * | 5/2006 | Kottapalli | 711/134 |

* cited by examiner

*Primary Examiner*—Hiep T Nguyen
(74) *Attorney, Agent, or Firm*—Cantor Colburn LLP; Ken Corsello (57) ABSTRACT

A system, method and computer program product for executing a cache replacement algorithm. A system includes a computer processor having an instruction processor, a cache and one or more useful indicators. The instruction processor processes instructions in a running program. The cache includes two or more cache levels including a level one (L1) cache level and one or more higher cache levels. Each cache level includes one or more cache lines and has an associated directory having one or more directory entries. A useful indicator is located within one or more of the directory entries and is associated with a particular cache line. The useful indicator is set to provide an indication that the associated cache line contains one or more instructions that are required by the running program and cleared to provide lack of such an indication.

20 Claims, 6 Drawing Sheets

SYSTEM, METHOD AND COMPUTER PROGRAM PRODUCT FOR EXECUTING A CACHE REPLACEMENT ALGORITHM

BACKGROUND OF THE INVENTION

The invention relates generally to the operation of cache memory in a processor, and more particularly, to executing a cache replacement algorithm that mitigates the negative effects of speculative fetching in a cache memory.

Instruction-fetching within processors may be autonomous with respect to the actual processing of instructions. This is particularly true when instruction-fetching is driven by a branch prediction mechanism that records historical branch addresses within the code, and the historical target addresses for those branches. Such mechanisms have been referred to as branch history tables (BHTs), and more recently branch target buffers (BTBs).

When presented with an instruction address, a BHT provides the next instruction address that should be fetched. If a branch was found, the BHT also provides a specific indicator as to where the branch instruction was found within the current instruction-fetch group and the specific target address for the branch.

Addresses used for instruction-fetching are aligned (i.e., have a granularity) based on the instruction-fetch width (e.g., double-word, quad-word or double-quad-word). In contrast, branch instructions and their target addresses are aligned based on the instruction width (e.g., word, halfword, or byte). Therefore, instruction-fetching is performed at a coarser granularity (i.e., higher bandwidth) than the actual processing of instructions. Further, instruction-fetch groups are fetched from a cache, which maintains data at an even coarser granularity (e.g., cache lines are typically 128, 256, or more bytes). Thus, each cache line contains multiple instruction-fetch groups, and each instruction-fetch group contains multiple instructions.

When a BHT outputs an instruction-fetch address, an attempt is made to fetch the associated instruction-fetch group (the group including the instruction-fetch address) from the level-one (L1) instruction cache. If the cache line containing the instruction-fetch group is resident in the L1 instruction cache, then the successful fetch attempt results in a "cache hit" and a copy of the instruction-fetch group is placed in an instruction buffer for eventual processing by the processor pipeline. If the cache line containing the instruction-fetch group is not resident in the L1 instruction cache, then the unsuccessful fetch attempt results in a "cache miss", and the address of the instruction-fetch group is sent to the next higher level cache in the cache hierarchy (e.g. a L2 cache) for processing. Eventually, a copy of the cache line containing the instruction-fetch group will be moved into the L1 instruction cache, and the instruction-fetch group can then be obtained from the newly resident cache line.

When a cache miss occurs, a new cache line will be brought into the L1 instruction cache. The new cache line will displace another line in the L1 instruction cache. Sometimes, the contents of the displaced line are still needed (or required) by the processor. When this is so, it is inevitable that another cache miss will be generated to re-fetch the displaced line. This new cache miss could have been avoided had the corresponding line not been displaced by the original miss.

When the original cache miss is useful (meaning that the line that is brought in contains instructions that actually must be executed), then the subsequent cache miss is unavoidable. However, in the case of instruction-fetching, many fetches are speculative (meaning that it is not certain that the instruction-fetch group being fetched contains instructions that will be executed) particularly when the instruction addresses are generated by a branch prediction mechanism. It would be useful if there were a way to eliminate the replacement of resident, and possibly useful, cache lilies by speculatively fetched cache lines that do not contain any instructions that actually have to be executed by the program.

BRIEF SUMMARY OF THE INVENTION

An embodiment includes a computer processor having an instruction processor, a cache and one or more useful indicators. The instruction processor processes instructions in a running program. The cache includes two or more cache levels including a level one (L1) cache level and one or more higher cache levels. Each cache level includes one or more cache lines and has an associated directory having one or more directory entries. A useful indicator is located within one or more of the directory entries and is associated with a particular cache line. The useful indicator is set to provide an indication that the associated cache line contains one or more instructions that are required by the running program and cleared to provide lack of such an indication.

Another embodiment includes a method of executing a cache replacement algorithm. The method includes determining placement of a selected cache line in a cache that that comprises two or more cache levels including a L1 cache and one or more higher level cache levels. Each cache line includes a plurality of cache lines and has an associated directory having a plurality of directory entries corresponding to the cache lines. The directory entries include useful indicators. Determining the placement is responsive to a useful indicator associated with the selected cache line. One or more of the useful indicators are updated in response to a system event.

A further embodiment includes a computer program product for executing a cache replacement algorithm. The computer program product includes a storage medium readable by a processing circuit and storing instructions for execution by the processing circuit for facilitating a method. The method includes determining placement of a selected cache line in a cache that that comprises two or more cache levels including a L1 cache and one or more higher level cache levels. Each cache line includes a plurality of cache lines and has an associated directory having a plurality of directory entries corresponding to the cache lines. The directory entries include useful indicators. Determining the placement is responsive to a useful indicator associated with the selected cache line. One or more of the useful indicators are updated in response to a system event.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

Exemplary embodiments prevent the replacement of instruction-cache lines with speculatively fetched cache lines (e.g., speculative L1 cache misses) if the probability is low that the speculatively generated miss is to a line containing instructions that are actually needed (or required) by the running program. A field, referred to herein as a "useful indicator bit" is associated with each cache line to record whether the cache line contains instructions that have actually completed execution. The useful indicator bit is set within the L2 cache directory, reset within the L1 cache directory, and is subsequently maintained by the L2 cache directory. The replacement of useful lines in the cache may be prevented by suppressing prefetches made to lines that have historically not been useful and/or by replacing a cache line that has a higher possibility of not being used instead of a known, useful cache line, even when it is higher in the least recently used (LRU) stack. Thus, objects of exemplary embodiments include avoiding prefetching instruction lines if they have historically proven to not be useful (e.g., not retrieved for execution by the program) and avoiding the replacement of instruction lines if they have historically proven to be useful.

Figure 1:
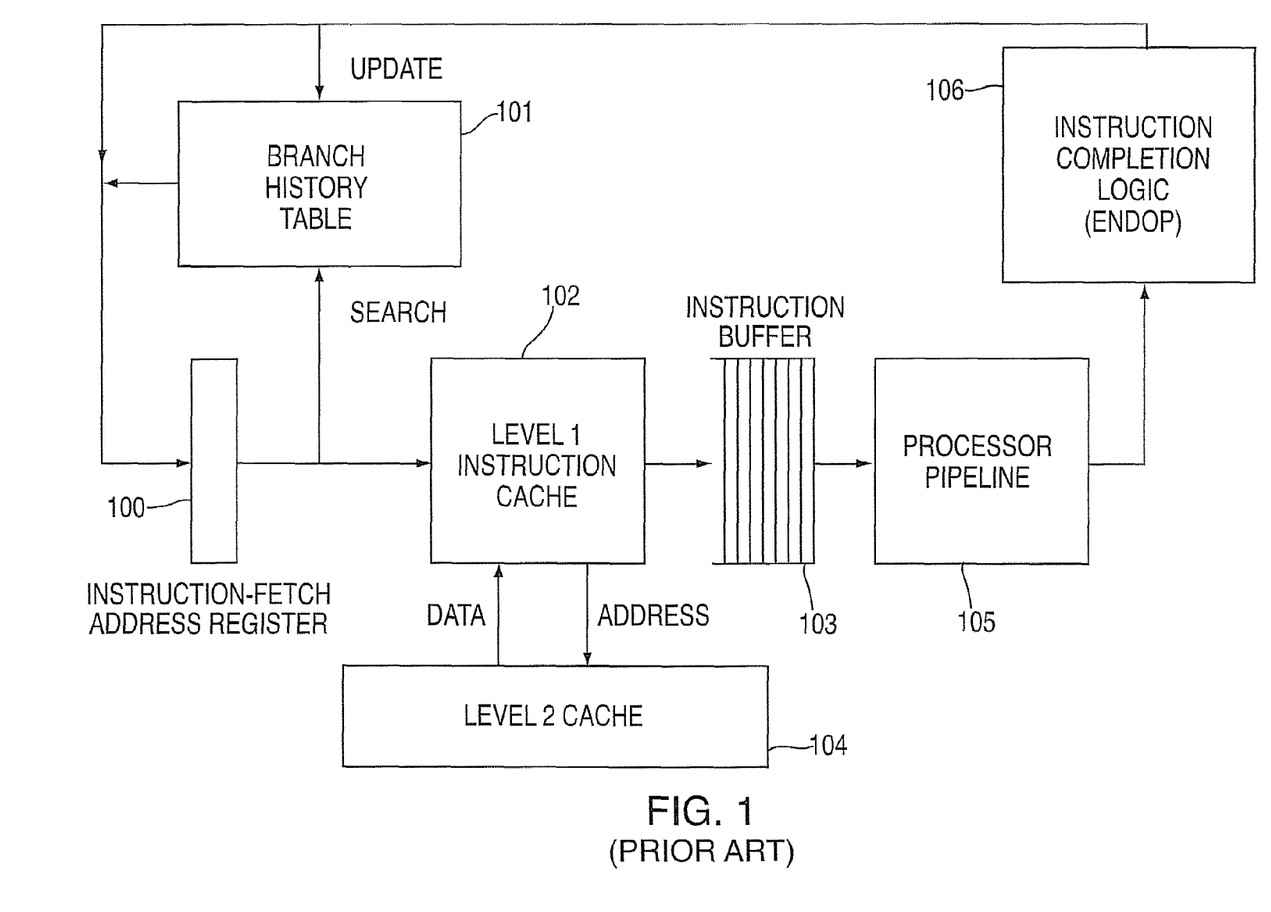
FIG. 1 illustrates an exemplary processor that generates speculative instruction-fetches.

FIG. 1 depicts an exemplary processor in which the prefetching mechanism runs autonomously with respect to the rest of the processor pipeline. To start a program, an initial instruction address is placed into the instruction-fetch address register 100. Two simultaneous things are done with the instruction-fetch address: 1) the BHT 101 is searched, and the next instruction-fetch address is generated, to be loaded into the instruction-fetch address register (IFAR) 100 on the next cycle; and 2) the fetch address is sent to the L1 instruction cache 102 and a copy of the fetch group is placed into the instruction buffer 103. If the corresponding fetch group is not found in the L1 instruction cache 102, then a cache miss occurs. When a cache miss occurs, the miss address is sent to the L2 cache 104, and a copy of the line containing the requested instruction-fetch group is copied into the L1 instruction cache 102, thereby displacing another cache line. Typically, the displaced line is the LRU line in the chosen congruence class. LRU bits are maintained for each congruence class to keep track of the ordering of recency of use for lines contained within the congruence class.

Autonomously, with respect to the instruction fetching, the processor pipeline 105 takes instructions out of the instruction buffer 103, and processes them. When an instruction completes, it is finalized by the instruction completion logic 106 (sometimes called the ENDOP). The instruction completion logic 106 verifies that the instruction completed correctly without generating exceptions that may delay or invalidate the result of the instruction. Once a completed instruction is verified by the instruction completion logic 106, its results are manifested with the architected state of the known program. Specifically, the instruction completion logic 106 releases any stores that the instruction was to perform, and updates any register contents that the instruction was to update.

Further, when the instruction completion logic 106 finds that a branch instruction had been incorrectly predicted by the BHT 101, it does two things simultaneously: 1) it stages an update to the BHT 101 to reflect the newly discovered branch behavior; and 2) it resets the state of the EFAR 100 to be consistent with the newly discovered branch behavior. Instruction prefetching then resumes with the newly corrected instruction-fetch address.

It is understood that predicted branch paths can, in fact, be subject to correction at earlier points in the processing of an instruction (e.g., as soon as a misprediction is discovered), and that the appropriate redirection can begin immediately; it need not wait for the branch instruction to clear the instruction completion logic 106. Therefore, the specific discussion so far has merely exemplified, and was not meant to limit, the typical operation of speculative instruction-fetching.

Figure 2:
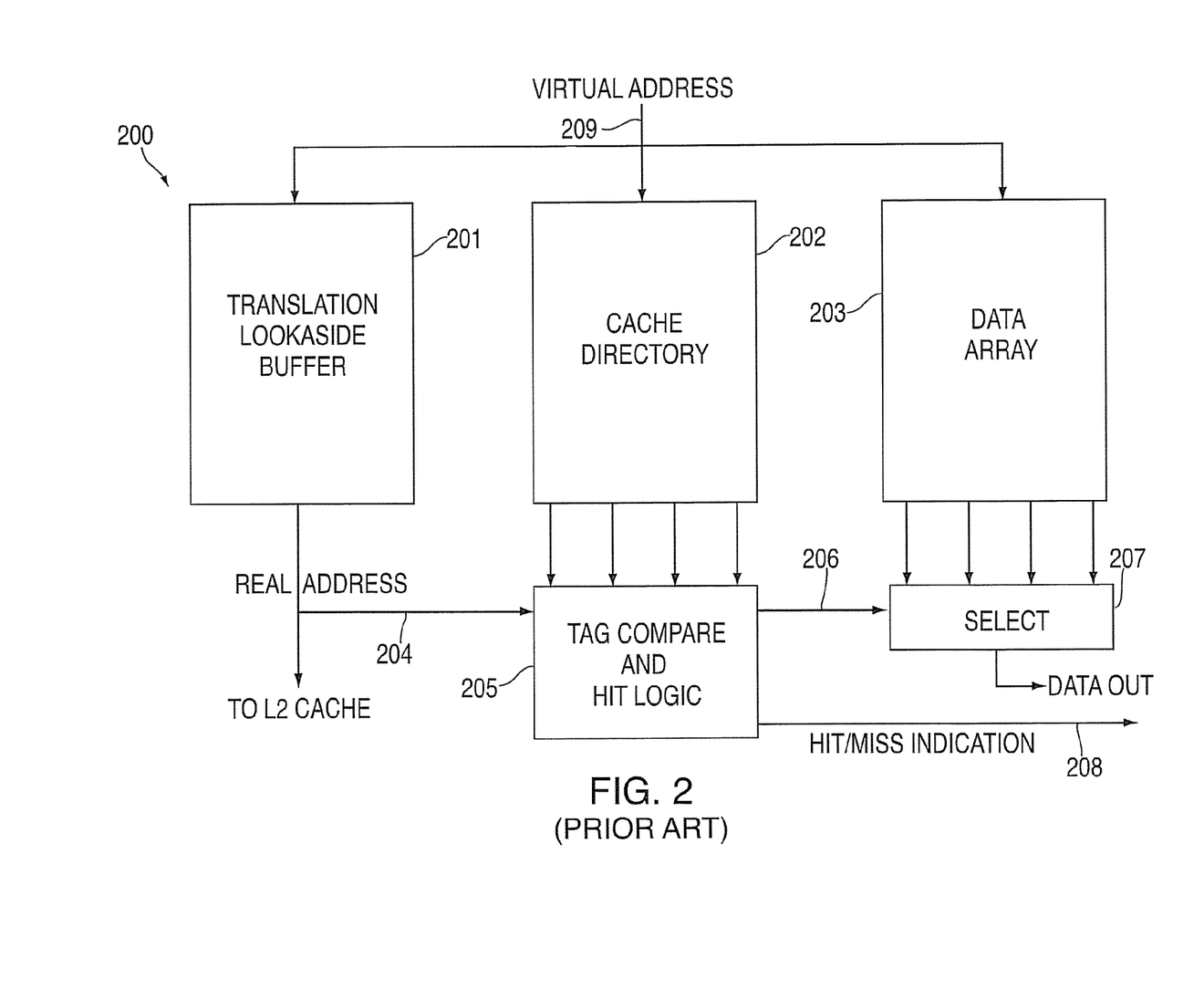
FIG. 2 illustrates a high-level view of an exemplary level-1 (L1) cache.

FIG. 2 depicts an exemplary L1 cache 200, which is accessed with a virtual address 209. The virtual address 209 is an address that is (logically) generated by a running program. An access to memory requires a real address 204, since the operating system needs to make sure that memory, which is a shared resource, is useable by all co-resident programs. The L1 cache 200 depicted in FIG. 2 includes a translation lookaside buffer 201, a cache directory 202, and a data array 203.

The translation lookaside buffer 201 is a small cache of recently translated virtual addresses. Given the virtual address 209 that is used to access the L1 cache 200, the translation lookaside buffer 201 will provide the corresponding real address 204. If the translation lookaside buffer 201 does not have the translation of a particular virtual address, then a translation process is invoked, and the result is put into the translation lookaside buffer 201. The specifics of the translation process are well known to one skilled in the art.

In FIG. 2, it is assumed that the L1 cache 200 uses "virtual placement," which means that the physical location chosen for data is chosen in accordance with the virtual address 209 used to access the data. Caches can also use "real placement" where the real address 204 is required to start looking in the cache directory 202 and data array 203, so the data access cannot begin until the translation lookaside buffer 201 search is complete. In general, the use of real replacement results in slower performance than virtual placement.

Assuming virtual placement, the virtual address 209, in FIG. 2, is used to access the cache directory 202 and the data array 203 at the same time that its translation (i.e., the real address 204) is being fetched from the translation lookaside buffer 201.

Often, the cache directory 202 and the data array 203 are "set associative" structures, meaning that for a given address, there will be a number of different entries that could potentially map to that address. The number of such entries is called the "set associativity" of the structure. While the cache directory 202 and the data array 203 may have the same set associativities, they need not. In either case, there is a 1-to-1 mapping between physical locations in the cache directory 201 (called "directory entries"), and the data array 203 (called "cache lines").

Data are stored into the cache on the granularity of cache lines, which can be 32, 64, 128, or 256 bytes, or even larger (although the line size is typically fixed for a particular cache). The data array 203 contains the cache lines. Each directory entry in the cache directory 202 corresponds to a unique location, hence cache line, in the data array 203. The directory entry contains necessary information about its associated line. Specifically, it contains a tag that identifies the address associated with the line, and it contains state information, e.g., whether the line is valid, and other information (used for coherency).

When the virtual address 209 is used to access the cache directory 202, the directory entries contained in the sets to which the virtual address maps (4 are shown in FIG. 2) are read out. In the tag compare and hit logic 205, the address tags of those entries are compared to the translated real address 204 to see whether any of the candidate entries match the address being sought. If there is a match, the tag compare and hit logic 205 sends an indication of the appropriate set 206 to the select logic 207, which selects the associated cache line as it is being read out of the data array 203. At the same time, the tag compare and hit logic 205 evaluates the state information to determine whether the set that matched (if there was one) is valid. It provides a hit/miss indication signal 208 indicating whether the fetch request resulted in a hit or a miss.

If a miss is indicated by the hit/miss indication signal 208, then the data coming out of the select logic 207 is not used, and the miss is sent to the next higher level cache in the hierarchy, the L2 cache in this example. Note that if a miss is sent to the L2 cache, the real address 204 is used. Caches that are accessed with a real address do not need, hence do not contain, translation lookaside buffers.

Figure 3:
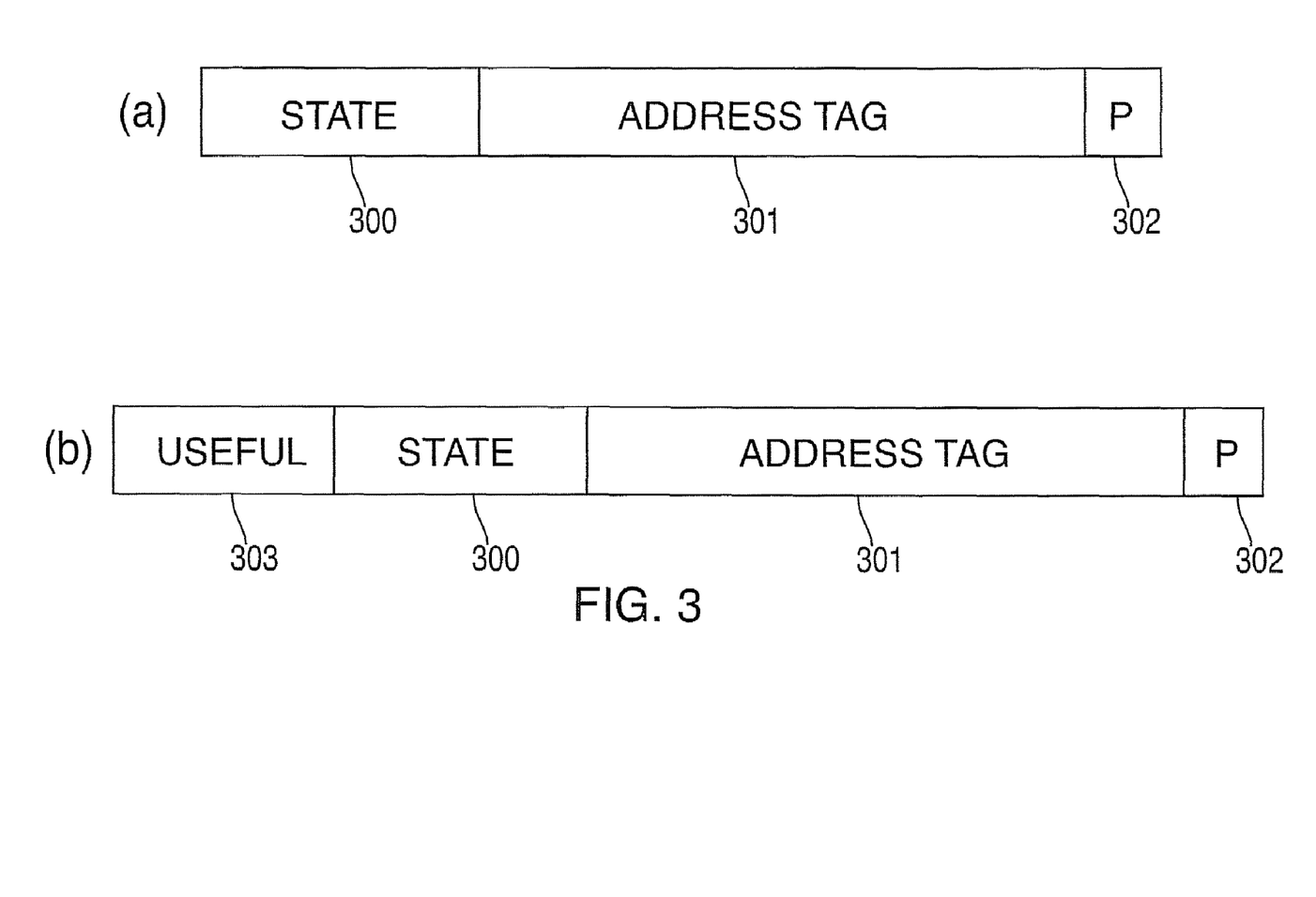
FIG. 3 illustrates the fields in a directory entry within an exemplary cache.

FIG. 3 depicts the fields in an exemplary directory entry in the cache directory 202. The entry labeled "(a)" includes three fields: a state field 300, an address tag field 301 and a parity or "P" field 302. The state field 300 indicates the state in which the cache line corresponding to the directory entry is being held. If the corresponding cache line contains valid data, then the state 300 indicates one of several possible valid states. The differences in the valid data states are used to manage coherency. If the corresponding cache line does not contain valid data, then the state 300 indicates this. The address tag field 301 contains sufficient information for unambiguously inferring the real address corresponding to the entry. The P field 302 includes check bits (for example, plurality bits) that are used to detect and possibly correct errors.

The entry labeled "(b)" in FIG. 3, shows the addition of a useful indicator bit 303, in exemplary embodiments implemented as a single bit (but may be expanded to more than one bit), to the directory entry labeled "(a)." The useful indicator bit 303 is utilized to indicate whether the corresponding cache line is likely to contain instructions that are actually needed by the running program (as opposed to speculatively fetched instructions down branch paths that have a high likelihood of not actually being followed). In exemplary embodiments, the indication of usefulness (e.g., the useful indicator bit 303) is incorporated into the state field 300. In exemplary embodiments, the useful indicator bit 303 captures the actual usage of instruction cache lines as instructions complete, and indicates the usefulness (thus the necessity) of a cache line directly in the directory entry associated with the cache line. An explanation of the management of the useful indicator bit 303 in exemplary embodiments follows, as well as the way in which the useful indicator bit 303 is used to control the flow of data into the cache (hence the potential for displacement of other lines) in exemplary embodiments.

In exemplary embodiments, before a cache line is used by a running program, it is presumed to be useful. Therefore, when a cache line is first brought into the L2 cache (or whatever level is the highest in the cache hierarchy of the particular implementation) from the memory system, the useful indicator bit 303 in its corresponding directory entry is set (to '1') on any demand miss. As used herein the term "demand miss" refers to a miss that is generated by a reference that is known to be required by a running process, and that is known to be required at the time that the reference occurs. As used herein, the term "speculative miss" refers to a miss that is generated by a reference that is not known to be required at the time that it is made.

For example, an in-line instruction fetch that causes a miss when there are no unresolved branches outstanding is a "demand miss." The group of instructions being brought in by the miss is known to be needed (or required) by the program, since these instructions must follow what is already in process. Conversely, an instruction fetch causing a miss that is made to the target instruction of an unresolved conditional branch (e.g., by a branch prediction mechanism) is a "speculative miss," since it is not known with certainty that the target instruction is needed. If the branch is (subsequently) found to have not been taken, then the target instruction is not actually needed (at this time) for the running program to proceed.

Note that demand misses must be fetched, and it is known that the content is needed. Speculative fetches may or may not bring in useful content. It is just that whether the content is useful is unknown at the time that the fetch is made. In the example in the previous paragraph, the speculative miss to the target instruction will bring in useful content if the branch is (subsequently) found to be taken. And even if the branch is not taken, there is still the possibility that (although what was brought in is not needed at this time) instructions within the line will be needed prior to the time that the line is replaced. In this case, the speculative miss, although found to be "wrong," could in fact bring in useful content—thereby avoiding a future miss.

Figure 4:
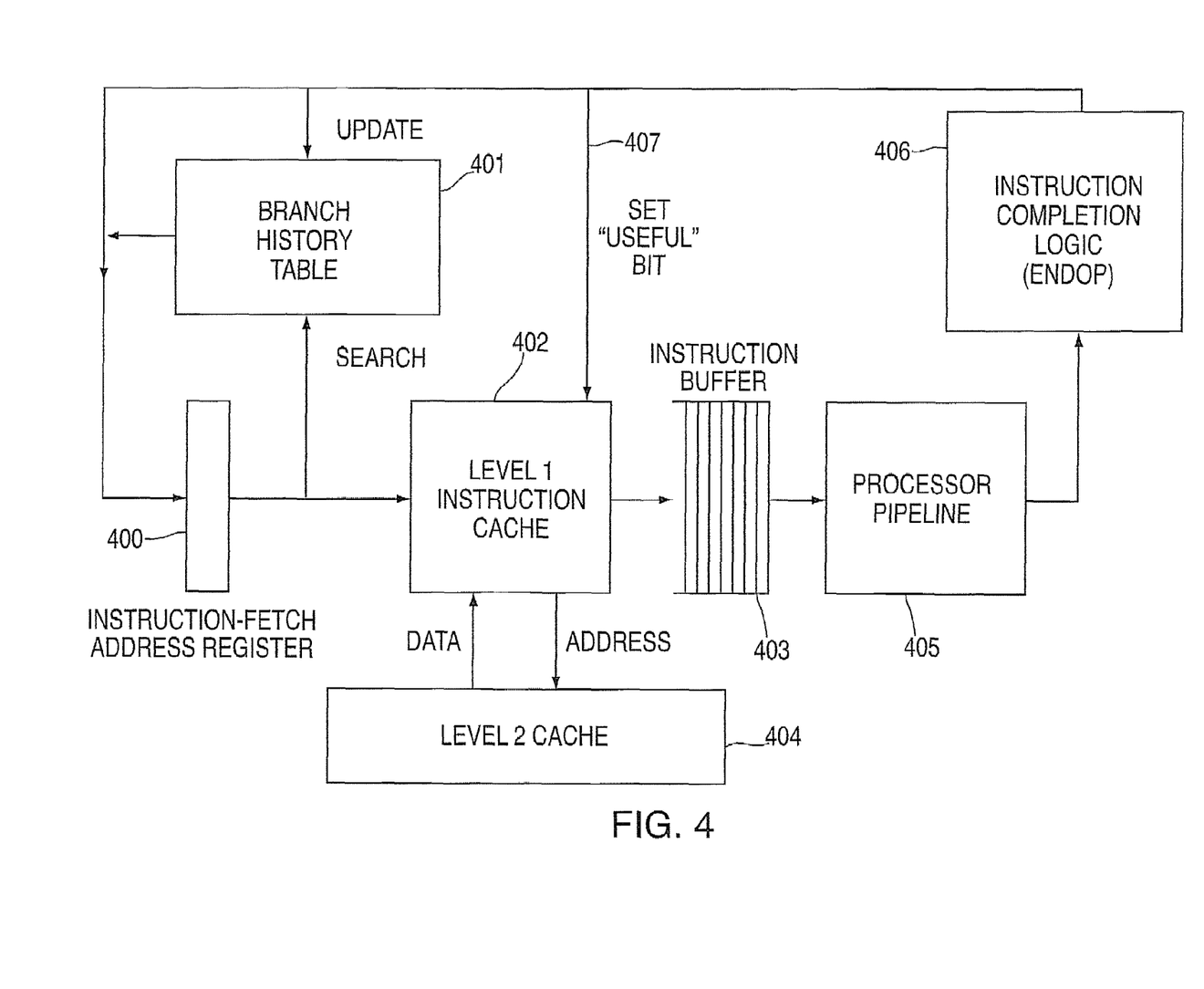
FIG. 4 illustrates a processor that generates speculative instruction-fetches including the addition of a useful bit that may be implemented by exemplary embodiments.

FIG. 4 depicts the same flow as FIG. 1 with the addition of a set useful bit path 407 from the instruction completion logic 406 to the L1 instruction cache 402. Whenever the instruction completion logic 406 confirms/verifies the completion of an instruction, the instruction cache line from which that instruction was fetched will have its useful indicator bit 303 set.

When a cache line propagates up or down in the cache hierarchy, its useful indicator bit 303 is copied from the adjacent level directory. As used herein, the terms "up" and "down" refer, respectively, to increasing and decreasing indices in the cache hierarchy. The exception is that whenever cache lines are brought into the L1 instruction cache 402, their associated useful indicator bits 303 are reset (to '0'). When the cache line is evicted from the L1 instruction cache 402, the state of the useful indicator bit 303 (which may have been set during its residence in the L1 instruction cache 402) is written back to the L2 cache 404 directory entry so as to reflect the usage of the cache line while it was in the L1 instruction cache 402.

Since all newly placed lines in the L1 instruction cache 402 start with their useful indicator bits 303 reset (to '0'), only those cache lines from which instructions are actually completed will have their useful indicator bits 303 set (to '1') by the time they are replaced. When they are replaced, their useful indicator bits 303 are written back to the L2 cache directory. Therefore, all cache lines in the L2 cache directory having the useful indicator bit 303 set are either new cache lines (being referenced for the first time), or they are cache lines from which instructions were known to have completed during the last line residency in the L1 instruction cache 402.

If there is an L1 cache miss that was speculatively generated (as opposed to a demand miss issued by the executing program), a miss request is sent to the L2 cache 404 with a "speculative" indication and will only cause data to be transferred to the L1 instruction cache 402 (thereby replacing another line) if the useful indicator bit 303 of the requested cache line is set. Otherwise, the miss request will be rejected.

In this way, only those cache lines that are known to contain necessary instructions (or new lines) are permitted to evict other lines from the L1 instruction cache 402.

Figure 5:
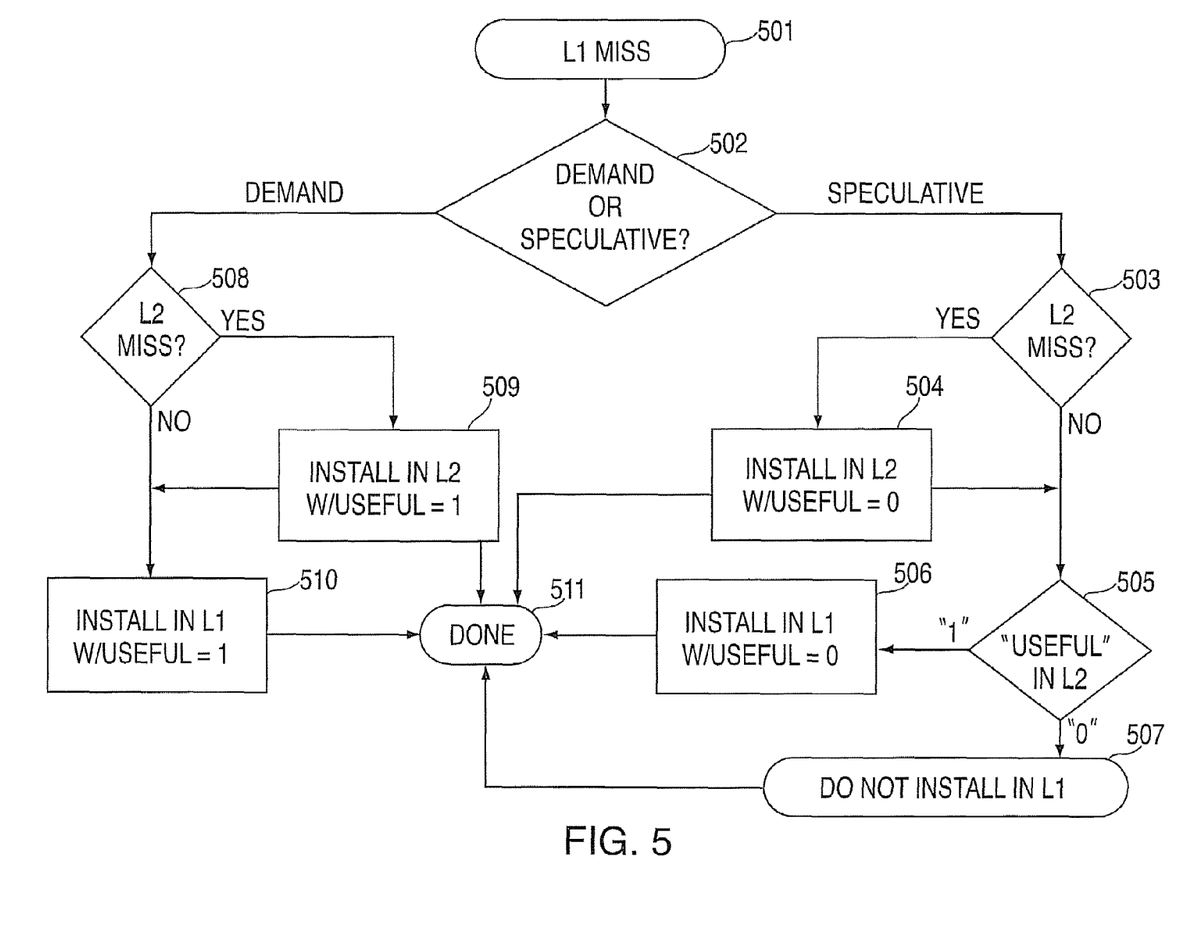
FIG. 5 illustrates an exemplary embodiment of a decision flow diagram for fetching lines and setting the useful bits.

FIG. 5 shows an exemplary process flow that may be implemented by exemplary embodiments of the present invention. Demand misses from the L1 instruction cache 402 and from the L2 cache 404 result in the cache line being added to both the L1 instruction cache 402 and the L2 cache 404. Demand misses from the L2 cache 404 include demand misses from the L1 instruction cache 402 that are also L2 cache 404 misses. Speculative misses from L1 instruction cache 402 that miss in the L2 cache 404 result in the cache line being installed in the L2 cache 404 with the useful indicator bit 303 reset (to '0'). Speculative L1 instruction cache 402 misses will only cause the cache line to be brought into the L1 instruction cache 404 if the useful indicator bit 303 in the L2 cache 404 is '1'. When lines are brought into the L1 instruction cache 404 speculatively, they will initially have their useful indicator bits 303 reset (to '0').

At block 501 in FIG. 5, a L1 miss occurs when an instruction is requested from the L1 instruction cache 402. At block 502, it is determined if the miss is a demand miss or a speculative miss. Block 503 is performed if the L1 miss is a speculative miss. At block 503, it is determined if the requested instruction is located in a cache line contained in the L2 cache 404. If the requested instruction is not located in the L2 cache (i.e., a L2 miss occurs), then block 504 is performed and the cache line with the instruction is added (or installed) in the L2 cache 404 with the useful indicator bit 303 reset to zero. Processing is then completed at block 511. If the requested instruction is located in the L2 cache 404, as determined at block 503, then block 505 is performed to determine the value of the useful indicator bit 303 in the cache line in the L2 cache 404 containing the requested instruction. If the useful indicator bit 303 is set to one in the L2 cache 404, then block 506 is performed and the cache line is installed in the L1 instruction cache 402 with the useful indicator bit 303 reset to zero. Processing is then completed at block 511. If the useful indicator bit 303 is set to zero in the L2 cache 402, as determined at block 505, then block 507 is performed and the cache line is not installed in the L1 instruction cache 402. Processing is then completed at block 511.

If it is determined, at block 502, that the miss is a demand miss, then block 508 is performed. At block 508, it is determined if the requested instruction is located in a cache line contained in the L2 cache 404. If the requested instruction is not located in the L2 cache (i.e., a L2 miss occurs), then block 509 is preformed and the cache line with the instruction is added (or installed) in the L2 cache 404 with the useful indicator bit 303 set to one. Processing is then completed at block 511. If the requested instruction is located in the L2 cache 404, as determined at block 508, then block 510 is performed and the cache line is installed in the L1 instruction cache 402 with the useful indicator bit 303 set to one. Processing is then completed at block 511.

In exemplary embodiments, a two-fold approach is utilized to optimize cache contents. The first part of the approach is to avoid bringing in potentially useless cache lines. The second part of the approach is to avoid replacing potentially useful cache lines. The first part, avoiding prefetching instruction lines if they have historically proven to have not been useful, is described above in reference to FIG. 5. The second part of the approach, avoiding replacing cache lines that have historically proven to be useful is described below.

In any congruence class in an n-way set-associative cache, there are "n" sets. Each set holds a cache line. As cache lines within the congruence class are referenced, the replacement algorithm records the ordering of those references. The most recently used (MRU) set holds the cache line that was referenced last. The LRU set holds the cache line that has been in the cache the longest without being referenced. Arbitrarily, these sets may be labeled 1, 2, . . . , n, where "1" denotes the MRU set, "n" denotes the LRU set, and indices 2, . . . , n−1 denote the ordered list of recency of usages for those sets in between.

In a typical system, the cache line in the LRU set is the cache line that is replaced by any incoming line. The heuristic guess is that the line that has sat there the longest without being referenced (the LRU cache line) is a cache line that is no longer needed. In exemplary embodiments of the present invention, this is improved by also incorporating the aforementioned useful indicator bits 303 into the decision. In some cases, this results in different sets being chosen for replacement, thus avoiding replacing lines that are known to be useful when possible.

Therefore, if the LRU set contains a cache line for which the useful indicator bit 303 is set to one, sets that are more recently used than this one are searched to see whether there is a cache line having its useful indicator bit 303 reset to zero. If such a cache line is found, and it is not too close to being the MRU, it is selected for replacement instead of the LRU. It is not desirable to replace an MRU cache line having its useful indicator bit 303 equal to zero, because it is a recently prefetched line that might be referenced soon.

Instead, a specific stack position, "k", is chosen where $1<k<n$. An attempt is made to identify a LRU set in $\{k, \ldots, n\}$ that has a useful indicator bit 303 equal to zero. If there is such a set, the cache line in that set is chosen for replacement. If there are no sets in $\{k, \ldots, n\}$ having a useful indicator bit 303 equal to zero, then the LRU set, n is chosen for replacement. In many cases, this results in a better replacement choice than pure LRU replacement.

Figure 6:
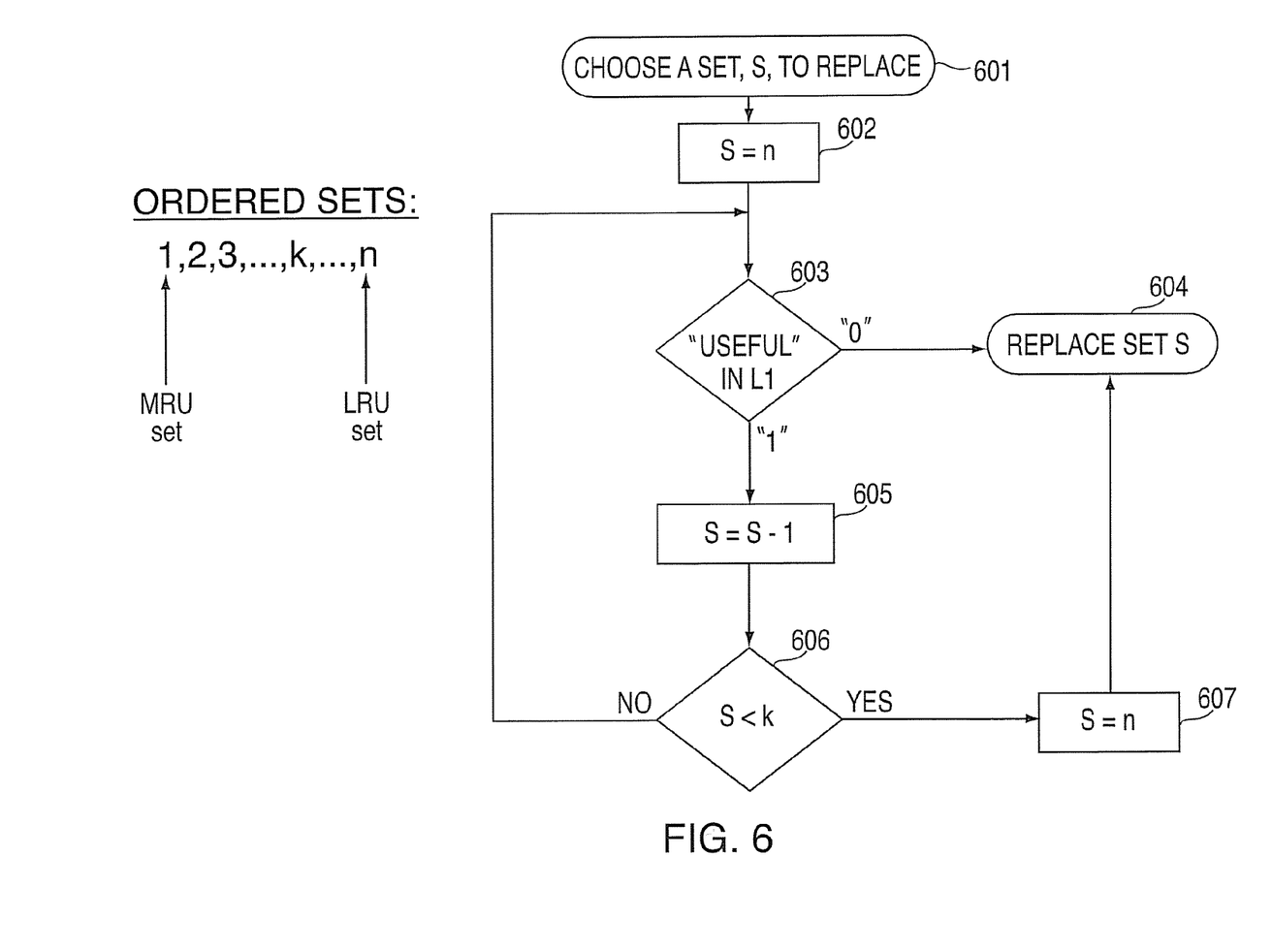
FIG. 6 illustrates an exemplary embodiment of a process flow diagram for improved replacement incorporating the useful bits.

FIG. 6 illustrates an exemplary embodiment of a process flow diagram for improved replacement incorporating the useful indicator bits 303. FIG. 6 depicts a process that starts with set "n", and looks back in the stack for cache lines having a useful indicator bit 303 equal to zero. The first such cache line found is replaced, unless k is reached without finding any such cache line; in this case, the cache line in set n, the LRU cache line, is replaced.

Referring to block 601 in FIG. 6, a set, "S", in the cache will be chosen for replacement by a new cache line. At block 602, "S" is set to "n" (the LRU set). At block 603, it is determined if the useful indicator bit 303 in the selected cache line, "S", is equal to zero. If it is equal to zero, then block 604 is performed and the selected cache line, "S", is replaced with the new cache line. Otherwise if the useful indicator bit 303 is equal to one, then block 605 is performed and "S" is set to "S−1", thus moving to the next most LRU cache line. If "S" is less than "k", then "S" is set to "n" at block 607 and processing continues at block 604. Otherwise processing continues at block 603.

The value of k can be chosen by benchmark. The only restrictions on k are that $1<k<n$. This is because if k=1, then newly prefetched lines will be replaced before the system has an opportunity to determine whether the prefetch was useful. If k=n, then the algorithm degenerates to the LRU algorithm. An exemplary choice of k is one that allows replacement in the bottom half of the stack, i.e., k=(n/2)+1. Therefore, if n=4, k=3, and lines will be replaced early if they reach the $3^{rd}$ MRU set without being used. If n=8, k=5, and lines will be replace early if they reach the 5$^{th}$ MRU set without being used.

It is understood that while the exemplary embodiments above describe the setting of the useful indicator bit (also referred to as the useful bit) upon completion of each instruction, this operation can be modified. For example, the completion of multiple instructions within the same cache lines can be recognized and aggregated into a single setting of the useful bit. Or, after first setting a useful bit for a cache line, subsequent completions to instructions within that same line can be recognized as superfluous with respect to the setting the bit again.

Further, in alternate embodiments, the useful indicator bit 303 may be a multi-bit field instead of a single bit. It may be implemented by saturating counters to provide hysteresis. When a 2-bit counter is used, the basic idea is that the prediction must be proven wrong twice in succession before changing the prediction. This variation is a readily understood technique that has been used pervasively in other aspects of computer architecture. The use of a counter would not otherwise alter the invention, and may provide better results in some cases.

Thus, objects of exemplary embodiments include avoiding prefetching instruction lines if they have historically proven to not be useful (e.g., not retrieved for execution by the program) and avoiding the replacement of instruction lines if they have historically proven to be useful.

Technical effects and benefits of exemplary embodiments include avoiding prefetching instruction lines if they have historically proven to not be useful (e.g., not retrieved for execution by the program) and avoiding the replacement of instruction lines if they have historically proven to be useful.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer processor comprising:
   an instruction processor for processing instructions in a running program;
   a cache comprising two or more cache levels including a level one (L1) cache level and one or more higher cache levels, each cache level comprising one or more cache lines and having an associated directory having one or more directory entries;
   a useful indicator within one or more of said directory entries and associated with a particular cache line, each useful indicator being set to provide an indication that the associated cache line contains one or more instructions that are required by the running program and cleared to provide lack of such an indication; and
   a cache line fetch mechanism which utilizes the useful indicators to suppress prefetches from the higher cache levels to the L1 cache.

2. The computer processor of claim 1 wherein one of or more of the useful indicators are modified upon full completion of an instruction.

3. The computer processor of claim 1 wherein one of the useful indicators is modified when placing a cache line into the L1 cache level.

4. The computer processor of claim 3 wherein the modification includes the setting of the useful indicator to a one for a demand fetch and to a zero for a speculative fetch.

5. The computer processor of claim 1 wherein the useful indicator comprises a single bit.

6. The computer processor of claim 1 wherein the directory entries include a plurality of useful indicators including the useful indicator.

7. The computer processor of claim 1 further comprising a least recently used (LRU) mechanism for ordering recency of use of cache lines.

8. The computer processor of claim 7 wherein the directory entries include a plurality of useful indicators including the useful indicator and the computer processor further comprises a cache line replacement mechanism which utilizes the useful indicators and the LRU mechanism to avoid replacing lines that have historically proven to be useful.

9. A method of executing a cache replacement algorithm, the method comprising:
   determining placement of a selected cache line in a cache that comprises two or more cache levels including a L1 cache and one or more higher level cache levels, each cache level comprising a plurality of cache lines and having an associated directory having a plurality of directory entries corresponding to the cache lines, the directory entries including useful indicators and the determining responsive to a useful indicator associated with the selected cache line;
   suppressing prefetches from the higher cache levels to the L1 cache when the useful indicator is set to zero indicating that the cache line is not useful;
   placing prefetches from the higher cache levels to the L1 cache when the useful indicator is set to one indicating that the cache line is useful; and
   updating one or more of the useful indicators in response to a system event.

10. The method of claim 9 wherein the useful indicator associated with the selected cache line indicates if the selected cache line has been accessed.

11. The method of claim 9 further comprising utilizing the useful indicators and an LRU mechanism to implement a cache line replacement algorithm.

12. The method of claim 9 wherein the system event is a full completion of an instruction that has accessed the selected cache line.

13. The method of claim 9 wherein each of the useful indicators comprise a single bit.

14. The method of claim 9 wherein the cache includes a L1 cache and a L2 cache and the determining includes:
  receiving a L1 cache miss for a target cache line, the cache miss being a speculative miss or a demand miss;
  if the L1 cache miss is a demand miss and the target cache line is located in the L2 cache, then installing the target cache line into the L1 cache and setting an associated useful indicator to one;
  if the L1 cache miss is a demand miss and the target cache line is not located in the L2 cache, then installing the target cache line into the L2 cache and setting the associated useful indicator to one;
  if the L1 cache miss is a speculative miss and the target cache line is not located in the L2 cache, then installing the target cache line into the L2 cache and setting the associated useful indicator to zero; and
  if the L2 cache miss is a speculative miss and the target cache line is located in the L2 cache with the associated useful indicator equal to one, then installing the target cache line in the L1 cache and setting the associated useful indicator to zero.

15. A computer program product for executing a cache replacement algorithm, the computer program product comprising:
  a storage medium readable by a processing circuit and storing instructions for execution by the processing circuit for facilitating a method comprising:
  determining placement of a selected cache line in a cache that comprises two or more cache levels including a L1 cache and one or more higher level cache levels, each cache level comprising a plurality of cache lines and having an associated directory having a plurality of directory entries corresponding to the cache lines, the directory entries including useful indicators and the determining responsive to a useful indicator associated with the selected cache line;
  suppressing prefetches from the higher cache levels to the L1 cache when the useful indicator is set to zero indicating that the cache line is not useful;
  placing prefetches from the higher cache levels to the L1 cache when the useful indicator is set to one indicating that the cache line is useful; and
  updating one or more of the useful indicators in response to a system event.

16. The computer program product of claim 15 wherein the useful indicator indicates if the selected cache line has been accessed.

17. The computer program product of claim 15 wherein the method further comprises utilizing the useful indicators and an LRU mechanism to implement a cache line replacement algorithm.

18. The computer program product of claim 15 wherein the system event is a full completion of an instruction that has accessed the selected cache line.

19. The computer program product of claim 15 wherein the useful indicator comprises a single bit.

20. The computer program product of claim 15 wherein the cache includes a L1 cache and a L2 cache and the determining includes:
  receiving a L1 cache miss for a target cache line, the cache miss being a speculative miss or a demand miss;
  if the L1 cache miss is a demand miss and the target cache line is located in the L2 cache, then installing the target cache line into the L1 cache and setting an associated useful indicator to one;
  if the L1 cache miss is a demand miss and the target cache line is not located in the L2 cache, then installing the target cache line into the L2 cache and setting the associated useful indicator to one;
  if the L1 cache miss is a speculative miss and the target cache line is not located in the L2 cache, then installing the target cache line into the L2 cache and setting the associated useful indicator to zero; and
  if the L2 cache miss is a speculative miss and the target cache line is located in the L2 cache with the associated useful indicator equal to one, then installing the target cache line in the L1 cache and setting the associated useful indicator to zero.

* * * * *